United States Patent Office 3,578,642
Patented May 11, 1971

3,578,642
POLYMERIZATION OF ALKENE OXIDES WITH AN ORGANOALKALINE EARTH COMPLEX AND AN ORGANOALUMINUM CATALYST SYSTEM
Francis X. Mueller, Jr., Louisville, Ky., and James D. Brown, Bartlesville, Okla., assignors to Phillips Petroleum Company
No Drawing. Filed Dec. 18, 1968, Ser. No. 784,899
Int. Cl. C08g 17/02, 22/04, 23/00
U.S. Cl. 260—78.3                                  6 Claims

ABSTRACT OF THE DISCLOSURE

Alkene oxides are polymerized alone or copolymerized with acrylic acid esters, methacrylic acid esters, lactones, or other alkene oxides in the presence of an organoalkaline earth compound and an organoaluminum compound.

---

This invention relates to a process for polymerizing alkene oxides alone and to a process for copolymerizing alkene oxides with polymerizable acrylic acid esters, methacrylic acid esters, lactones, or other alkene oxides in the presence of a polymerization initiator system comprising an organoalkaline earth compound and an organoaluminum compound.

In another aspect, this invention relates to a new composition of matter useful as a polymerization initiator comprising an organoalkaline earth compound and an organoaluminum compound.

It has now been discovered that a polymerization initiator comprising an organoalkaline earth compound and an organoaluminum compound is surprisingly effective in the polymerization initiation of an alkene oxide alone or in admixture with another alkene oxide and in the copolymerization of alkene oxides wtih polymerizable acrylic acid esters, methacrylic acid esters, or lactones. It has been further discovered that the organoalkaline earth compound and organoaluminum compound function together to improve the polymerization process.

It is an object of this invention to provide a new process for polymerizing an alkene oxide alone or in admixture with another alkene oxide.

It is an object of this invention to provide a new process for copolymerizing alkene oxides with polymerizable acrylic acid esters, methacrylic acid esters, or lactones.

It is an object of this invention to provide a new composition of matter comprising an organoalkaline earth compound and an organoaluminum compound. It is a further object of this invention to prepare an alkene oxide polymer containing terminal hydroxyl groups. Other objects, advantages, and features of our invention will be apparent to those skilled in the art from the disclosure and discussion herein set forth.

According to our invention, if an organoaluminum compound is employed in conjunction with an organoalkaline earth compound as a polymerization initiator system for alkene oxide polymerization, much higher conversion rates and also much higher conversions are achieved than when either component is used singly.

The organoalkaline earth compounds suitable for employment in our invention include the reaction products obtained by reacting an elemental metal selected from magnesium, calcium, strontium, or barium, with a pyridine-type compound, a polynuclear aromatic compound, or a polyaryl-substituted ethylene.

Those pyridine-type compounds as herein defined and used throughout the specification and claims that are suitably employed for producing the organic portion of the organoalkaline earth compound are selected from pyridine, bipyridines, or polycyclic fused-ring aromatic compounds where at least one of said fused rings is a pyridine ring, and wherein the number of carbon atoms of the pyridine, bipyridine, or polycyclic fused-ring aromatic compounds is 5 to 40 and wherein the said pyridine-type compound can contain alkyl, cycloalkyl, aryl, alkoxy, aryloxy, alkylthiol, arylthiol, or N,N-dialkylamino substituents and combinations thereof such as cycloalkylalkyl, arylalkyl, and the like, wherein the number of carbon atoms in all the substituents is from 1 to 24. These compounds can also contain halogen substituents, i.e., chloro, fluoro, bromo, and iodo. Exemplary of these compounds are:

benzo[b]-1,5-naphthyridine;
pyrido[2,3-g]quioline;
benzo[c][1,8]naphthyridine;
phenanthridine;
pyrido[2,3-f][1,7]phenanthroline;
dibenzo[b,g][1,8]naphthyridine;
naphth[1,2-h]isoquinoline;
quino[5,6-b][4,7]phenanthroline;
naphtho-[1,2-b][4,7]phenanthroline;
dibenz[b,i]acridine;
acridine[1,2-a]acridine;
phenaleno[1,2,3-k,l]acridine;
dinaphtho[2,3-c:2',3'-i]phenanthridine;
4-cyclopentyl-6-phenoxy-dinaphth[2,3-a:2,3'-j]acridine;
1-phenyl-5-ethoxy-benzo[c]benz[5,6]acridino[3,4-h] acridine;
2-(4-ethylphenyl)-6-butylthio-benzo[1,2-c:5,4-c']- diacridine;
3-phenylthio-[7-phenylthio]-7-cyclohexylmethyl-9-(N,N- diethylamino)phenanthro[2,1,10-m,n,a]acridine;
2-benzyl-quino[5,6-b][1,7]phenanthroline;
1-chloro-10-ethoxy-benzo[c][1,7]naphthyridine;
5-bromo-10-ethyl-4,7-phenanthroline;
7-iodo-10-phenylbenzo[c][2,7]naphthyridine;
4-phenylthio-4'-N,N-dibutylamino-2,2'-bipyridine;
4-chloro-4'-bromo-3,3'-bipyridine;
1,4,5,8-tetraphenylacridine;
4-phenylpyridine;
5-methylquinoline;
4,4'-dichloro-2,2'-bipyridine;
3-ethoxy-2,3'-bipyridine;
4-cyclohexylisoquinoline;
9-fluoroacridine;
8-bromo-1,5-phenanthroline;
9-iodo-1,8-phenanthroline;
pyridine;
2,2'-bipyridine;
2,3'-bipyridine;
2,4'-bipyridine;
3,3'-bipyridine;
3,4'-bipyridine;
4,4'-bipyridine;
quinoline; isoquinoline; acridine;
1,5-phenanthroline;
1,8-phenanthroline;
4,5-phenanthroline.

Those polynuclear aromatic compounds employed for producing the organoalkaline earth compound are aromatic hydrocarbons containing at least a 2-ring structure in which at least two of said rings are aromatic and at least two of said rings are fused and said polynuclear aromatic hydrocarbon has from 12 to 40 carbon atoms per molecule. These polynuclear aromatic hydrocarbons can contain alkyl, cycloalkyl, aryl, alkoxy, aryloxy, alkylthiol, arylthiol, N,N-dialkylamino, halogen substituents, i.e. chloro, fluoro, bromo, and iodo, or combinations thereof such as cycloalkylalkyl, arylalkyl, and the like, wherein the carbon atoms of all the substituents total not more than 25. Exemplary of these compounds are anthracene;
9-bromoanthracene;
1-bromonaphthalene;
9,10-dibromoanthracene;
9,10-dimethylanthracene;
9,10-diphenylanthracene;
phenanthrene;
9,10-benzphenanthrene;
2,3-benzanthracene;
1,2-benzanthracene;
chrysene; acenaphthylene;
perylene; fluoranthene;
3-(3-ethylcyclohexyl)anthracene;
4-(2-cyclohexylethyl)tetracene;
4,7-diethoxyfluoranthene;
1-phenoxyl-6-methylcoronene;
6-ethylthioaceanthrylene;
6,8-di(phenylthio)hexacene;
7-(N,N-diethylamino)acephenanthrylene;
3,8,14-triphenoxytrinaphthylene;
1,3,6,8-tetraphenylthiopyrene;
1,15-dipentylpyranthrene;
4-N,N-(dimethylamino)perylene;
heptaphene; heptacene; pentaphene;
ribicene; pleiadene; pentacene;
1,4,8,11-tetracyclohexylpentacene;
9-methylanthracene;
9-phenylanthracene;
9,10-dicyclohexylanthracene; or
9,10-di(N,N-dimethylamino)anthracene;

and the like.

The polyaryl-substituted ethylene employed for producing the organoalkaline earth compounds is ethylene that has been substituted with at least two aryl-substituted radicals and said polyaryl-substituted ethylene has from 14 to 40 carbon atoms per molecule. The said aryl substituents can contain alkyl, cycloalkyl, aryl, alkoxy, aryloxy, alkylthiol, arylthio, or N,N-dialkylamino radicals and combinations thereof such as cycloalkylalkyl, arylalkyl and the like, wherein the carbon atoms of these latter radicals total not more than 25. Exemplary of those compounds are cis and trans 1,2-diphenylethylene (stilbene);

1,1-diphenylethylene;
triphenylethylene;
tetraphenylethylene;
1-phenyl-2-(1-naphthyl)ethylene;
1,1-diphenyl-2-(2-naphthyl)ethylene;
1,2-di(1-naphthyl)ethylene;
1-(4-methoxyphenyl)-1-(4-phenoxyphenyl)-2-[4-(3-methylcyclopentyl)phenyl]-2-(4-cyclohexylmethylphenyl)ethylene;
1-(4-methylthiophenyl)-1-(4-phenylthiophenyl)-2-[4-(N,N-diethylamino)phenyl]ethylene;
tetra-(4-phenoxyphenyl)ethylene;
tetra-(1-naphthyl)ethylene, and the like.

Any method known to the art can be employed for preparing the organoalkaline earth compounds of this invention. One method generally preferred comprises contacting substantially pure elemental metal; in the form of turnings or shot, or the like, so as to provide a form of metal with as much exposed surface metal as possible; with the pyridine-type compound, the polynuclear aromatic compound or the polyaryl-substituted ethylene compound. It is important that the metal be protected from air and maintained accordingly so as to prevent the formation of oxides thereon.

The polynuclear aromatic compound, the polyaryl-substituted ethylene or the pyridine-type compound and the elemental metal are brought together at a temperature in the range of about $-100$ to $200°$ F., preferably about $-20$ to $125°$ F. The contacting is carried out in the presence of an ethereal diluent of mono- or polyethers including acyclic and cyclic ethers. Alkyl, aryl, or cycloalkyl ethers, or combinations thereof, containing 2 to 20 carbon atoms per molecule and about 1 to 4 ether groups per molecule can be employed. Exemplary ethers are diethyl ether, dibutyl ether, methyl butyl ether, phenyl methyl ether, diphenyl ether, cyclohexyl methyl ether, tetrahydrofuran, 1,2-dimethoxyethane, 1,4-dioxane and the like. Tetrahydrofuran; 1,2-dimethoxyethane; or 1,4-dioxane are the preferred diluent ethers.

When preparing the organoalkaline earth compound herein described, it is believed likely that the ethereal diluents form ether complexes with the organoalkaline earth compound thus produced.

When a very finely divided metal form is employed such as produced by the vaporization of calcium in an electric furnace as described by V. Sinn, B. Francois, N. Mayer, and J. Parrod in Compt. Rend. (Paris), 262, Ser. C, pp. 541–544 (1966), it is unnecessary to contact the organic compounds with the metal in the presence of ether diluents. The contacting can then be carried out generally in any inert diluent such as aliphatic, aromatic, cycloaliphatic, or araliphatic hydrocarbons and the like.

Employment of the vaporized metal is not the preferred procedure due to the more costly and more complex electric furnace procedures used for the preparation of such a very finely divided metal.

Metals that have been prepared by such a method often present polymerization initiator activity themselves, but are, however, generally inferior to the initiators of this invention. The solution or suspensions of the initiators produced according to this invention are more easily handled in charging, measuring, or other transfer operations than the vaporized metal themselves. This subsequently results in improved controls of the polymerization reaction in terms of initiator level and thus the molecular weight of the polymer.

Another disadvantage of conducting polymerization reaction with finely divided metals as produced by the electric furnace method is that they often show long induction periods and then rapid uncontrolled reactions.

Also, these very finely divided metals are more susceptive to inactivation by accidental contact with air or other oxygen-containing gases resulting in inactivation of large portions of the finely divided metal by the formation of an oxide surface coating thereon.

The ratio of gram atoms of metal to moles of polynuclear aromatic compound, to moles of polyaryl-substituted ethylene or to moles of pyridine-type compounds is in the range of about 1:1 to 25:1. It is preferred to use an amount of metal in excess of the 1:1 ratio with a more preferred ratio being 4:1 to 15:1.

Organic promoters which react immediately to expose fresh metal surface area can also be employed during the preparation of the organoalkaline earth compound. Alkyl or alkylene halogen-containing promoters such as 1,2-dibromoethane methyl iodide, ethyl bromide, or ethyl iodide, and the like function accordingly. The well-known Grignard reaction utilizes such a promoter and is described in Organo-Metallic Compounds by G. E. Coates, pp. 46–47, 2nd ed., John Wiley & Sons, Inc., New York (1960).

The amount of promoter, if employed, is generally in the range of about 0.002 to 0.2 mole, preferably about 0.005 to 0.1 mole per gram atom of metal and preferably containing the bromide or iodide halogen with 1,2-dibromoethane being the preferred promoter for use with this invention.

The organoaluminum compounds employed in the polymerization initiator system of this invention can be represented by the formula $R_3Al$ where R is a saturated aliphatic, saturated cycloaliphatic, or an aromatic radical or combinations thereof such as aliphaticaromatics, and the like containing from 1 to 20 carbon atoms. Exemplary compounds include trimethylaluminum,
triethylaluminum,
tri-n-propylaluminum,
triisopropylaluminum,
tri-n-butylaluminum,
tri(2-methylbutyl)aluminum,
tri-n-octylaluminum,
tri-n-dodecylaluminum,
tricyclohexylaluminum,
triphenylaluminum,
tribenzylaluminum,
trieicosylaluminum,
diethyl-n-butylaluminum,
tri-4-tolylaluminum,
tri(2-hexyltetradecyl)aluminum,
methyldi(4-cyclohexyloctyl)aluminum,
ethyldi(2-butylcyclohexyl)aluminum,
tri(2,4,8-trimethylhendecyl)aluminum, and the like.

The mole ratio of the organoalkaline earth compound to the organoaluminum compound depends to some extent upon the catalyst level desired but generally is in the range of 0.05:1 to 20:1.

As hereinbefore stated, the polymerization initiators of this invention can be employed for the homopolymerization of any polymerizable alkene oxide or for the copolymerization with one or more other alkene oxides, acrylic acid esters, methacrylic acid esters, and lactones.

The polymerization initiator system of this invention can be used for polymerizing alkene oxides containing up to and including 20 carbon atoms per molecule but are particularly useful in the polymerization of alkene oxide monomers containing from about 2 to about 8 carbon atoms per molecule. Thus, alkene oxides which can be polymerized in accordance with this invention can be represented by the formula

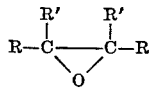

wherein R and R' are selected from hydrogen, saturated aliphatic, saturated cycloaliphatic, monoolefinic aliphatic, diolefinic aliphatic (conjugated and nonconjugated), monoolefinic cycloaliphatic, diolefinic cycloaliphatic (conjugated and nonconjugated), and aromatic radicals and combinations of these such as arylalkyl, alkaryl, and the like. Some or all of the R and R' radicals can be halogen-substituted and can contain oxygen in the form of an acylic ether linkage (—O—) or an oxirane group

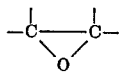

Further, the alkene oxides represented by the above formula can contain 1 or 2 olefinic linkages, 1 or 2 oxirane groups, and 0 or 1 ether linkages. In addition, both R' variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Exemplary of some alkene oxides which can be homopolymerized or copolymerized in accordance with this invention are ethylene oxide (epoxyethane);
1,2-epoxypropane (propylene oxide);
1,2-epoxybutane;
2,3-epoxybutane;
1,2-epoxypentane;
2,3-epoxypentane;
1,2-epoxyhexane;
3,4-epoxyhexane;
1,2-epoxyheptane;
2,3-epoxyoctane;
2,3-dimethyl-2,3-epoxypentane;
1,2-epoxy-4-methylpentane;
2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;
6-oxabicyclo[3.1.0]hexane;
7-oxabicyclo[4.1.0]heptane;
3-propyl-7-oxabicyclo[4.1.0]heptane;
bis(2,3-epoxypropyl)ether;
tert-butyl-4,5-epoxyhexyl ether;
2-phenylethyl 3,4-epoxybutyl ether;
allyl 2,3-epox propyl ether (allyl glycidyl ether);
allyl 3,4-epoxybutyl ether;
1-methylallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monooxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl 3,4-epoxybutyl ether;
1-methylallyl 6-phenyl-3,4-epoxyhexyl ether;
5-(4-tolyl)2,3-epoxypentyl vinyl ether;
bis[4-(3-cyclopentyl)2,3-epoxybutyl]ether;
2-(2,4-cyclohexadienyl)ethyl 2,3-epoxybutyl ether;
2-(2,5-cyclohexadienyl)ethyl-2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane;
1-phenyl-1,2-epoxy-5,7-octadiene and the like.

The lactones which can be copolymerized with the alkene oxides can be represented by the following formula:

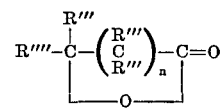

wherein R'''' is one of hydrogen and a radical of the formula

and when R'''' is a radical as specified, no R''' is attached to the carbon atom to which the R'''' radical is attached, wherein R''' is one of hydrogen, alkyl, cycloalkyl, and aryl and combinations thereof, wherein the total carbon atoms in the R''' and R'''' substituents being in the range of 1 to 12, and wherein $n$ being an integer which can be 1, 3, or 4. Suitable lactones include betapropiolactone, delta-valerolactone, epsilon-caprolactone, and lactones corresponding to the following acids:

2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-methylphenyl-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
2-(2-phenylethyl)-4-(4-cyclohexylbenzyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic acid,
4(3-phenylpropyl)-6-hydroxycaproic acid,
2-benzyl-5-isobutyl-6-hydroxycaproic acid,
7-phenyl-6-hydroxy-6-octenoic acid,
2,2-di(1-cyclohexenyl)-5-hydroxy-5-heptenoic acid,
2,2-dipropenyl-5-hydroxy-5-heptenoic acid,
2,2-dimethyl-4-propenyl-3-hydroxy-3,5-heptadienoic acid, and the like Any polymerizable acrylic acid ester or methacrylic acid ester can be copolymerized with one or more alkene oxides. Exemplary of those polymerizable compounds include methyl acrylate, ethyl acrylate, butyl acrylate, cyclohexyl acrylate, octyl acrylate, dodecyl acrylate, methyl methacrylate, ethyl methacrylate, butyl methacrylate, cyclohexyl methylmethacrylate, octylmethacrylate, dodecylmethacrylate, benzyl acrylate, benzyl methacrylate and the like.

The polymerization reaction can be conducted according to general methods and conditions known to the art. The reaction is generally conducted however, in a hydrocarbon diluent, i.e., paraffinic, cycloparaffinic, or aromatic hydrocarbon containing 4 to 10 carbon atoms per molecule. Polymerization temperatures in the range of −50 to 200° F. can be employed. Temperatures in the range of 0 to 122° F. are preferred. Higher and lower temperatures can be employed if desired. The concentration of the organoalkaline earth compound employed is about .1 to 100 (mhm.) gram millimoles per 100 grams of monomer(s) and preferably about 1 to 20 (mhm.).

The products prepared in accordance with this invention range from liquids to solids depending upon particular types of monomers that are employed. The products can be used as plasticizers for rubber, as coating compositions, adhesive formulations, and the like. The alkene oxide polymers contain terminal hydroxy groups and thus have utility as intermediates in the formation of polyurethanes which can ultimately be employed as insulation material for refrigerators, in the building construction, and the like.

Illustrative of our invention and not to be interpreted as a limitation on the materials herein employed or upon the general scope of this invention, the following examples are presented.

EXAMPLE I

According to a preferred embodiment of our invention, the organoalkaline earth component was prepared employing the following formula and technique:

| | |
|---|---|
| Anthracene, mole | 0.025. |
| Ca, 6 mesh shot, g. atom | 0.10. |
| 1,2-dibromoethane, mole | 0.001 (0.10 ml.) |
| Tetrahydrofuran, ml. | 100. |
| Temperature, ° F. | 122 |
| Time, hours | 144 |

The anthracene was charged to the reactor first followed by the calcium and then the tetrahydrofuran. The reactor was flushed with argon and 1,2-dibromoethane was added. The temperature was adjusted to 122° F. and maintained at this level for 144 hours. The calcium-anthracene reaction product precipitated as it was formed. The mixture was centrifuged, the tetrahydrofuran was withdrawn, and the solid product was washed (stirred) with 100 mls. of toluene at 122° F. for 30 minutes. The mixture was centrifuged, toluene withdrawn, and washing was repeated. After the second washing and toluene withdrawal the insoluble reaction product was dispersed in 100 mls. of toluene. The alkalinity of this dispersion was determined by titration with 0.1 normal HCl. The molarity was found to be 0.105.

The calcium-anthracene reaction product was then employed with an organoaluminium compound as the polymerization initiator system for polymerizing an alkene oxide according to the following recipe:

| | Parts by weight |
|---|---|
| Cyclohexane | 780 |
| Propylene oxide | 100 |
| Triisobutylaluminum, mhm. | Variable |
| Calcium-anthracene reaction product, mhm. | Variable |
| Temperature, ° F. | 41 |
| Time, hrs. | 24 | mhm.=gram millimole per 100 grams of monomer.

The cyclohexane was charged and the reactor was then purged with nitrogen. Propylene oxide was introduced, the mixture was cooled in an ice bath, triisobutylaluminum was added when used, and then the calcium-anthracene reaction product (when used). After 24 hours, a 10 weight percent solution of 2,2′-methylene-bis(4-methyl-6-tert-butylphenol) in a mixture of equal parts by volume of isopropyl alcohol and toluene was added to the polymerization mixture. The amount used was sufficient to provide one part by weight of the antioxidant per 100 parts by weight of monomer charged to the polymerization. The polymer was recovered by evaporation of the diluent. The results of the propylene oxide polymerization are reported in Table I.

TABLE I

| | Triisobutyl-aluminum, mhm. | Calcium anthracene, mhm. | Conversion, percent |
|---|---|---|---|
| Run Number: | | | |
| 1 | 20 | 0 | 2 |
| 2 | 10 | 10 | 100 |
| 3 | 0 | 20 | 4 |

The product from Run 2 was a viscous liquid. The above example demonstrates the effectiveness of our initiator system to quickly and completely polymerize alkene oxides and to clearly demonstrate the unexpected effects of our 2-component polymerization initiator system in contrast to using either the organoaluminum compound or the organoalkaline earth compound singly.

EXAMPLE II

Propylene oxide was polymerized in the presence of triisobutylaluminum (TBA) and a calcium-anthracene reaction product as the polymerization initiator system and cyclohexane was employed as the diluent. The ratio of the catalyst components was varied. The amount of cyclohexane and propylene oxide were the same as in Example I. The polymerization temperature was 41° F.

and the time was 24 hours. Liquid polymers were obtained in all runs. Results were as follows:

|  | 1 | 2 | 3 |
|---|---|---|---|
| Triisobutylaluminum, mhm | 10 | 1 | 10 |
| Ca-anthracene, mhm | 1 | 10 | 10 |
| Conversion, percent | 87 | 9 | 100 |
| Inherent viscosity | 0.95 | (1) | 0.37 |

[1] Not determined.

These data show that the ratio of initiator components can be varied over a considerable range. Even Run 2, in which the catalyst level was 11 mhm., gave a considerably higher conversion than was obtained in Runs 1 and 3 of Example 1 in which the initiator level was 20 mhm.

EXAMPLE III

In order to demonstrate that alkylene oxide polymers prepared in the presence of the polymerization initiator systems of this invention contain terminal hydroxy groups, a run was made using the recipe of Run 2, Example I, for the polymerization of propylene oxide. In this run, the reaction was conducted at 41° F. for 28 hours. The polymerization was terminated as in Example I, the polymer solution was washed with water to remove catalyst residue, the aqueous and organic phases were separated, and the polymer was recovered from the organic phase by evaporation of the diluent. The product had an inherent viscosity of 0.48 and was gel free.

Samples of the polymer were heated overnight with variable amounts of toluene-2,4-diisocyanate at 50° C., variable amounts of triethylenetetramine were added and the samples were heated again overnight at 50° C. Crosslinking (gel formation) in the product showed that the polymer had terminal hydroxy groups which reacted with the isocyanate to form polyurethane. This product was then cured with the polyamine. Amounts of materials employed and results obtained were as follows:

|  | 1 | 2 | 3 |
|---|---|---|---|
| Polymer, grams | 5 | 5 | 5 |
| Toluene-2,4-diisocyanate, milliequivalent | 1.95 | 2.70 | 2.95 |
| Triethylenetetramine, milliequivalent | 1.95 | 2.70 | 2.95 |
| Gel, percent | 68 | 61 | 65 |

The above example demonstrates the existence of terminal hydroxy groups on the alkene oxide polymers produced according to this invention and further demonstrates their use as an intermediate in the production of polyurethanes.

EXAMPLE IV

Organocalcium compounds were prepared by reacting 0.025 mole each of 1-bromonaphthalene, 9-bromoanthracene, 9,10-dibromoanthracene, and 2,2'-dipyridyl with 0.10 gram atom of calcium in the presence of 100 ml. of tetrahydrofuran and 0.001 mole of 1,2-dibromoethane as in Example I. Reactions were conducted at 41° F. The time duration was 72.5–73 hours except for 2,2'-dipyridyl which was 141 hours.

The operability of these compounds as polymerization initiators, in conjunction with triisobutylaluminum, was demonstrated with propylene oxide. The recipe was the same as in Run 2, Example I. The polymerization temperature was 41° F. Results were as follows:

|  | Initiator prepared from— | | | |
|---|---|---|---|---|
|  | 9-Br anthracene | 1-Br naphthalene | 9,10-di-Br anthracene | 2,2'-dipyridyl |
| Polymerization time, hours | 29 | 29 | 29 | 24 |
| Conversion, percent | 100 | 100 | 100 | 100 |
| Inherent viscosity | 0.08 | 0.09 | 0.11 | (1) |

[1] Not determined.

These data show that a variety of compounds can be employed for preparing the organocalcium component for the polymerization initiator system of this invention. The results demonstrate that these catalyst systems gave high conversion of propylene oxide to polymer. The products were viscous liquids.

EXAMPLE V

A block copolymer of propylene oxide and epichlorohydrin was prepared in the presence of triisobutylaluminum and the reaction product of calcium with anthracene as the initiator. The calcium-anthracene reaction product was prepared as described in Example I except that the reaction time was 72 hours instead of 144 hours and the product was used as formed in tetrahydrofuran suspension. The polymerization recipe was as follows:

Step 1

| | |
|---|---|
| Cyclohexane, parts by weight | 780 |
| Propylene oxide, parts by weight | 100 |
| Triisobutylaluminum, mhm. | 20 |
| Ca-anthracene reaction product, mhm. | 10 |
| Temperature, ° F. | 41 |
| Time, hours | 27 |

Step 2

| | |
|---|---|
| Epichlorohydrin, parts by weight | 100 |
| Temperature, ° F. | 41 |
| Time, hours | 120 |
| Conversion, percent | 100 |

The reaction mixture was admixed with antioxidant solution as in Example I and the diluent evaporated to recover the polymer. The product was a viscous liquid. It had an inherent viscosity of 0.23 and a chlorine content of 17.5 weight percent.

The above example demonstrates block copolymer formation between two alkene oxides and further demonstrates employment of the as-formed tetrahydrofuran suspension of the organoalkaline earth component in the polymerization process.

EXAMPLE VI

Copolymers of propylene oxide with methyl methacrylate and with ε-caprolactone were prepared using triisobutylaluminum and the reaction product of calcium with anthracene as the catalyst. Runs were also made using each initiator component alone. Polymerization recipes were as follows:

|  | 1 | 2 |
|---|---|---|
| Toluene, parts by weight | 860 | 860 |
| Propylene oxide, parts by weight | 50 | 50 |
| Methyl methacrylate, parts by weight | 50 | |
| ε-Caprolactone, parts by weight | | 50 |
| Triisobutylalumium (TBA), mhm | Variable | Variable |
| Ca-anthracene reaction product, mhm | Variable | Variable |
| Temperature, ° F. | 41 | 41 |
| Time, hours | 31 | 31 |

When conducting the polymerization, toluene was charged first. The reactor was then purged with nitrogen, methyl methacrylate or ε-caprolactone was added, the propylene oxide was introduced, and the mixture was cooled in an ice bath. Triisobutylaluminum was added and then the calcium-anthracene reaction product. The polymers were recovered as in Example I. Results were as follows:

| Comonomer | TBA, mhm. | Ca-anthracene, mhm. | Conversion percent |
|---|---|---|---|
| Run No.: | | | |
| 1 ε-Caprolactone | 10 | 0 | 22.3 |
| 2 do | 0 | 10 | 11.3 |
| 3 do | 10 | 10 | 89 |
| 4 Methyl methacrylate | 10 | 0 | 4.2 |
| 5 do | 0 | 10 | 49 |
| 6 do | 10 | 10 | 79.2 |

These data show that the catalyst systems of this invention can be employed for the copolymerization of propylene oxide with methyl methacrylate and also with ε-caprolactone. Solid products were obtained in all runs.

EXAMPLE VII

Block copolymers of propylene oxide with ε-caprolactone or β-propiolactone were prepared using triisobutylaluminum and the reaction product of calcium with anthracene as the catalyst. Propylene oxide was polymerized first. The second monomer was then added and polymerization continued. The recipes were as follows:

|  | 1 | 2 |
|---|---|---|
| Step 1: |  |  |
| Cyclohexane, parts by weight | 585 | 585 |
| Propylene oxide, parts by weight | 50 | 50 |
| Triisobutylaluminum, mhm | 10 | 10 |
| Ca-anthracene reaction product, mhm | 5 | 5 |
| Temperature, °F | 41 | 41 |
| Time, hours | 24 | 24 |
| Step 2: |  |  |
| ε-Caprolactone, parts by weight | 50 |  |
| β-Propiolactone, parts by weight |  | 50 |
| Temperature, °F | 41 | 41 |
| Time, hours | 96 | 96 |
| Conversion, percent | 74 | 90 |

These data show that the catalyst systems of this invention can be utilized for the production of block copolymers of propylene oxide with lactones. Both products were solids.

As will be evident to those skilled in the art, various modifications of this invention can be made, or followed in light of the teachings and discussions set forth herein without departing from the scope or spirit of our invention.

We claim:

1. A process for polymerizing polymerizable alkene oxides which comprises contacting under polymerization conditions a polymerization initiator with at least one polymerizable alkene oxide, wherein said polymerization initiator is formed by admixing components comprising an organoalkaline earth compound and organoaluminum compound, wherein said organoalkaline earth compound is the reaction product of an organic compound selected from the group consisting of pyridine-type compounds, polynuclear aromatic compounds, and polyaryl-substituted ethylenic compounds and a metal selected from the group consisting of magnesium, calcium, strontium, and barium, and wherein said organoaluminum compound is represented by the formula $R_3Al$ wherein R is a saturated aliphatic, saturated cycloaliphatic, aromatic, or combination thereof radical, containing from 1 to 20 carbon atoms per radical.

2. The process of claim 1 wherein the mole ratio of said organoalkaline earth compound to said organoaluminum compound is about .05:1 to 20:1 and wherein the concentration of said organoalkaline earth compound is about .1 to 100 gram millimoles per 100 grams of monomer(s) employed.

3. The process of claim 1 wherein said polymerization process is conducted in a hydrocarbon diluent containing 4 to 10 carbon atoms per molecule and wherein the polymerization temperatures employed are from −50 to 200° F. and wherein the concentration of said organoalkaline earth compound is about 1 to 20 gram millimoles per 100 grams of monomer(s) employed.

4. The process of claim 1 wherein said organoalkaline earth compound is calcium anthracene; and wherein said organoaluminum compound is triisobutylaluminum.

5. The process of claim 1 wherein the organic portion of said organoalkaline earth compound is 9-bromoanthracene, 1-bromonaphthalene, 9,10-dibromoanthracene, or 2,2′-dipyridyl and wherein said polymerizable alkene oxide is propylene oxide.

6. The process of claim 1 wherein said polymerizable alkene oxide comprises propylene oxide or epichlorohydrin or mixtures thereof and wherein said polymerizable alkene oxide is copolymerized with a second monomer selected from methylmethacrylate, ε-caprolactone, or β-propiolactone.

References Cited

UNITED STATES PATENTS 3,417,064   12/1968   Bailey, Jr. _____ 260—79.5

JOSEPH L. SCHOFER, Primary Examiner

C. A. HENDERSON, JR., Assistant Examiner

U.S. Cl. X.R.

252—431; 260—2, 77.5, 80, 86.1, 89.5